United States Patent [19]

O'Nan et al.

[11] 4,054,727
[45] Oct. 18, 1977

[54] BATTERY WITH AN AGENT FOR CONVERTING HYDROGEN TO WATER AND A SECOND AGENT FOR RETAINING FORMED WATER

[75] Inventors: Thomas Charles O'Nan, White Plains; Frank L. Ciliberti, Ossining, both of N.Y.

[73] Assignee: P.R. Mallory & Co. Inc., Indianapolis, Ind.

[21] Appl. No.: 732,253

[22] Filed: Oct. 14, 1976

Related U.S. Application Data

[63] Continuation-in-part of Ser. No. 607,152, Aug. 25, 1975, abandoned.

[51] Int. Cl.² ............................................. H01M 2/12
[52] U.S. Cl. ....................................... 429/86; 429/153
[58] Field of Search ................................ 429/72–89, 429/153, 57, 55

[56] References Cited

U.S. PATENT DOCUMENTS

| 3,356,533 | 12/1967 | Carson, Jr. ............................ 429/55 |
| 3,470,024 | 9/1969 | George et al. ......................... 429/57 |
| 3,630,778 | 12/1971 | Kreidl et al. ...................... 429/57 X |
| 3,893,870 | 7/1975 | Kozawa ............................... 429/57 |
| 3,906,330 | 9/1975 | Salamon et al. ................. 429/72 X |

*Primary Examiner*—C. F. Lefevour
*Attorney, Agent, or Firm*—Ronald S. Cornell; Israel Nissenbaum; Charles W. Hoffmann

[57] ABSTRACT

A battery including means housing a plurality of electrically interconnected electrochemical cells. Each electrochemical cell includes a container retaining an aqueous electrolyte, and anode and cathode electrodes. The aqueous electrolyte evolves hydrogen, under certain conditions, during electrical discharge and/or storage of the cell. The cathode electrode includes a reducible oxide of a metal. The battery housing includes an agent for converting hydrogen to water molecules and a second agent for retaining water molecules.

5 Claims, 3 Drawing Figures

BATTERY WITH AN AGENT FOR CONVERTING HYDROGEN TO WATER AND A SECOND AGENT FOR RETAINING FORMED WATER

This is a continuation-in-part application Ser. No. 607,152 filed Aug. 25, 1975 now abandoned.

The present invention relates to a battery, and more particularly, to a battery with separate agents for converting evolved hydrogen to water molecules and for retaining such water molecules, and either means for directing movement of hydrogen and water molecules to the agents or a unitary means adjacent side wall of electricity interconnected cell containers within a housing for the battery.

The term "battery" as used herein means and includes a plurality of electrically interconnected electrochemical cells which convert chemical energy to electrical energy. Each cell has a container retaining aqueous electrolyte which, under certain conditions, evolves hydrogen during electrical discharge and/or storage, an anode electrode including a metal capable of displacing hydrogen from the aqueous electrolyte during electrical discharge and/or storage, and a cathode electrode containing a reducible oxide of a metal. Such cells include, but are not limited to, alkaline cells and acid cells with a zinc or magnesium anode, and an alkali or alkaline earth metal containing aqueous electrolyte.

Typically, a properly constructed electrochemical cell electrically interconnected with other such cells to form a battery experiences little, if any, harmful hydrogen evolution. However, some hydrogen will be displaced from aqueous cell electrolyte during electrical discharge and/or storage as a result of either an imbalance of cell components such as an electrochemical excess of anode zinc over cathode depolarizer or contact to cathodic impurities within the anode electrode metal. The amount of such hydrogen evolution is related to several factors including such items as the amount of metal included in the anode which displaces hydrogen from the electrolyte during electrical discharge and/or storage; the surface area of the anode exposed to the electrolyte; the amount of cathodic impurities; the amount of electrolyte present in the cell container; the rate of electrical discharge of the electrochemical cell; and the temperature within the cell during electrical discharge and/or storage.

Hermetically sealing each electrochemical cell container within the battery housing helps to minimize escape of evolved hydrogen from the cell; nevertheless some evolved hydrogen tends to diffuse through the plastic or rubber grommets used to help seal such cells.

Substantial evolution of hydrogen can result in an inability of the grommmet material to allow hydrogen to diffuse therethrough sufficiently fast to prevent harmful accumulation of hydrogen within the cell container. To help overcome the problem of hydrogen accumulation within a cell container, the cell container is provided with a vent through which accumulated hydrogen is released upon accumulation of a certain amount of hydrogen within the cell container.

A hermetically sealed housing for a battery which does not include a vent because of the environment in which the battery is to be operated, such as in sea water or other hostile environment, may accumulate high amounts of hydrogen. The accumulation of such amounts of hydrogen may cause disassociation of the battery housing and/or the cell containers thereby rendering the battery inoperative for its intended purpose.

The use of a metal oxide material within the battery housing to convert evolved hydrogen to water molecules results in several undesirable effects. One such undesirable effect is the accumulated water molecules may bridge the anode and cathode electrode terminations of a cell or of the battery thereby electrically shunting and unnecessarily discharging the cell or battery or, perhaps, electrically shorting the cell or battery (as the case may be) rendering the cell or battery inoperative for its intended purpose. To minimize the possibility of water molecules present within the battery housing acting as an electrical conductor between the anode and cathode electrodes of the cell or battery resulting in electrical discharge thereof, the battery housing retains an additional agent for retaining water.

Placement of such agents within the container for the electrochemical cell may result in undesirable operating conditions existing within the cell container. For example, inclusion of such agents within the container reduces the space available for active components, eg., electrolyte, anode and cathode, thereby reducing the discharge capacity of the cell. Further, such agents may contaminate and/or inhibit the desired electrochemical relationship between the various cell components. It would be desirable to place such agents within a battery housing but without the containers for the component electrochemical cells.

A feature of the present invention is to provide a battery including two types of agents with the first converting evolved hydrogen to water molecules and the second retaining water molecules, and either means for directing the movement of hydrogen and water molecules to the agents or a unitary means for retaining and substantially uniformly distributing agents adjacent to side walls of cell containers within the battery housing. A further feature of the present invention is a passageway between the cell containers and the agents to provide a closed system for directing the movement of hydrogen and water molecules. Another feature of the present invention is to provide a unitary means with spaced apart layers of a relatively thin material previous to hydrogen and impervious to water molecules which retains the agents between its layers. Another feature of the present invention is to provide a unitary means with compartments retaining agents in a substantially uniformly distributed manner in relation to side walls of the battery housing and the containers for the cells.

Generally speaking, the present invention relates to a battery comprising means housing a plurality of electrically interconnected electrochemical cells characterized in that the battery housing includes an agent for converting evolved hydrogen to water molecules and a second agent for thereafter retaining water molecules with either means for directing the movement of hydrogen and water molecules to the agents, or unitary means for retaining and substantially uniformly distributing the agents adjacent side walls of the battery housing and the containers for the cells.

The concepts of the present invention relate to electrochemical cells which include aqueous electrolyte that evolves hydrogen, under certain conditions, during electrical discharge and/or storage of the cell, an anode electrode that includes a metal capable of displacing hydrogen from aqueous electrolyte during electrical discharge and/or storage of the cell and a cathode that contains a reducible oxide of a metal. Electrochemical cells of the above type include alkaline and acid type cells.

Examples of aqueous alkaline cells of the above-mentioned type are cells having an anode of zinc (Zn), an electrolyte of potassium hydroxide (KOH) or sodium hydroxide (NaOH), preferably KOH substantially saturated with zinc oxide (ZnO), and a depolarizing cathode selected from either mercuric oxide (HgO), or divalent or monovalent silver oxide (AgO or $Ag_2O$), or manganese dioxide ($MnO_2$), or copper oxide (CuO). Generally speaking, the overall cell discharge reaction associated with an alkaline cell including a depolarizing cathode of HgO is $Zn + HgO \rightarrow ZnO + Hg + 2$ Faradays of electrical energy per mole of active electrode materials.

Examples of aqueous acid cells of the abovementioned type are cells having an anode including Zn, an electrolyte including either zinc chloride ($ZnCl_2$) or lithium chloride (LiCl) or a mixture of $ZnCl_2$ and ammonium chloride ($NH_4Cl$), and a depolarizing cathode including manganese dioxide ($MnO_2$); an anode including Zn, an electrolyte including $ZnCl_2$, and a depolarizing cathode including silver chloride (AgCl); an anode including magnesium (Mg), and an electrolyte including magnesium bromide ($MgBr_2$), and a depolarizing cathode including $MnO_2$. The above examples of aqueous alkaline and acid cells intended to be used in batteries embodying concepts of the present invention are only illustrative and not limiting.

Figure 1:
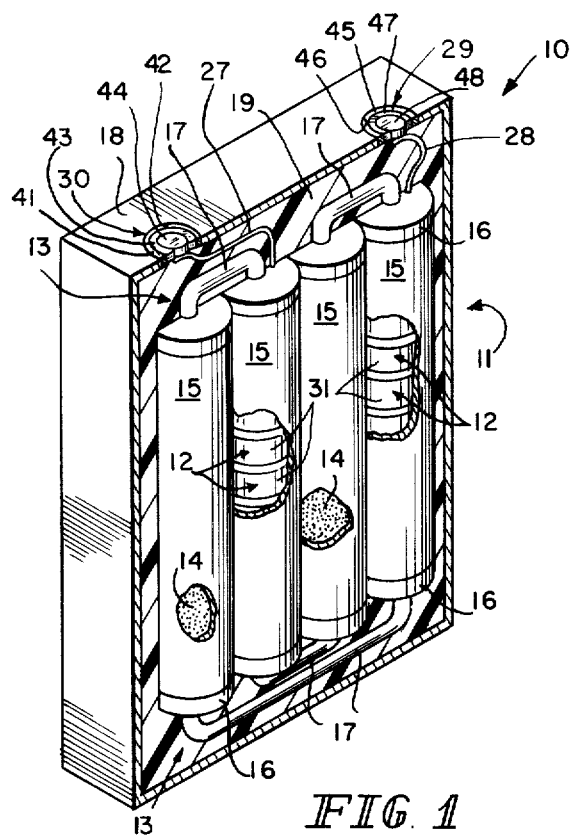
FIG. 1 is a cross sectional view of, with portionsthereof cut away, a battery embodying one form of the concepts of the present invention.

Referring now to FIG. 1 of the drawing, a battery 10 is shown as including a housing 11, a plurality of electrically interconnected cells 12, and means 13 for directing the flow of hydrogen and water molecules to hydrogen converting and water retaining agents 14 with one agent converting hydrogen to water molecules and the second thereafter retaining the water molecules. As shown in FIG. 1, the means 13, directing the flow of hydrogen and water molecules to agents 14, is a closed system.

The means 13 for directing the flow of hydrogen and water molecules to the agents 14 includes tubes 15 for retaining either stacked electrically interconnected cells 12 or the agents 14. As shown in FIG. 1, alternate tubes 15 contain stacked cells 12 whereas the other tubes 15 contain the agents 14. The tubes 15 are made of any suitable electrically insulating material having good mechanical strength which is inert with respect to the chemical action of hydrogen, water molecules and the agents 14 and which may be sealable. An example of a suitable material which may be used to form tubes 15 is spiral wound Draft paper coated with polystyrene. The open ends of the tubes 15 are closed by any suitable means such as by heat shrinkable caps 16 made of any suitable material such as polyvinylchloride, polyesters and fluorocarbons.

Passageways 17 interconnect the tubes 15 in either a series or parallel fashion. It is presently preferred that the passageways 17 interconnect the tubes 15 in a series fashion. As with the tubes 15, the passageways 17 should have good mechanical strength, be sealable and inert with respect to the chemical action of hydrogen, water molecules and the agents 14. Examples of a suitable material for the passageways 17 include polyolefin, vinyl and rubber. The passageways 17 may also be used as conduits for electrically conductive leads (not shown) electrically interconnecting the stacks of cells 12 within tubes 15.

Figure 2:
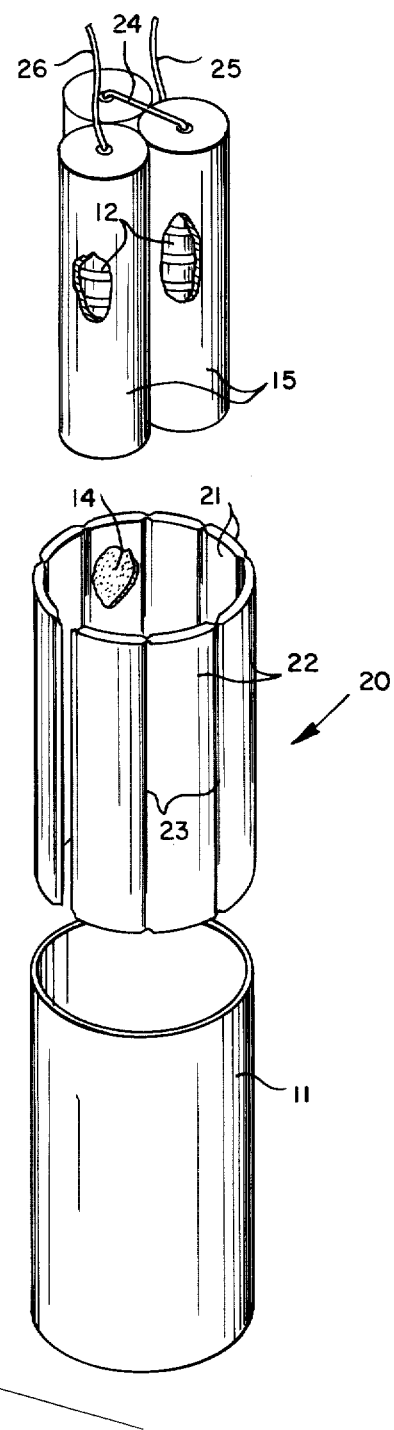
FIG. 2 is a prospective view of, with portions thereof cut away, a battery embodying another form of the concepts of the present invention.

Each of the interconnected cells 12 retained by the tubes 15 includes a container 31 retaining electrolyte (not shown in FIGS. 1 and 2) and also anode and cathode electrodes (not shown in FIGS. 1 or 2).

Suitable agents 14 for converting hydrogen to water molecules include powdered monovalent silver oxide ($Ag_2O$), copper oxide (CuO), active nickel oxide, manganese dioxide ($MnO_2$), and lead dioxide ($PbO_2$). Of the several agents for converting hydrogen to water molecules, the presently preferred agents are $Ag_2O$, CuO and $MnO_2$.

Suitable agents 14 for retaining water molecules include barium oxide (BaO), calcium oxide (CaO), strontium oxide (SrO), a porous form of aluminum oxide having capacity for absorbing water molecules, absorbent amorphous silica, and a molecular sieve including zeolites or similar materials whose atoms are arranged in a crystal lattice in such a way that there are large numbers of cavities interconnected by small openings or pores of substantially uniform size capable of retaining water molecules. Of the several agents 14 for retaining water molecules, BaO, CaO, SrO, and the molecular sieve are presently preferred. If the powdered form of the agents is used, it is presently preferred that the powder have about the consistency of talcum powder and that the agents 14 be intermixed. It should be understood that the hydrogen converting agents and the water retaining agent function independently with the former unreactive with water and the latter unreactive with the evolved hydrogen.

The housing 11 of the battery 10 used to contain the electrically interconnected stacked cells 12, the means 13 for directing the flow of hydrogen and water molecules to agents 14, and the agents 14 may be any suitable material having good mechanical strength that is substantially inert with respect to hydrogen, water molecules and the agents 14 confined within the housing. The presently preferred housing 11 for the closed system shown in FIG. 1 includes a metal case 18 with an epoxy resin 19 encapsulating the cells 12, the means 13 and the agents 14.

Electrically connected to and extending from one of the tubes 15 is electrically conducting lead 27 which is also electrically connected to terminal 30. Terminal 30 is a glass- to-metal seal including a metal outer ring 41 attached to the periphery of aperture 42 formed in the case 18, an electrically insulating glass inner ring 43 attached to the ring 41, and an electrically conducting disk 44 attached to ring 43. The lead 27 is attached to the disk 44. The glass ring 43 of the terminal 30 electrically insulates the electrically conducting disk 44 of the terminal from case 18. Electrically connected to and extending from the other tube 15 is electrically conducting lead 28 which is electrically connected to terminal 29. Terminal 29 is a glass-to-metal seal including a metal outer ring 45 attached to the periphery of aperture 46 formed in the case 18, an electrically insulating glass inner ring 47 attached to the ring 45, and an electrically conducting disk 48 attached to the ring 47. The lead 28 is attached to the disk 48. The glass ring 47 of the terminal 29 electrically insulates the electrically conducting disk 48 of the terminal from case 18. Terminals 29 and 30 are substantially identical but with different polarities.

In operation, a pressure difference, created between the tubes 15 containing the electrically interconnected cells 12 and the tubes 15 containing the agents 14 by the evolution of hydrogen, causes hydrogen to move through the passageways 17 to the tubes 15 containing the agents 14. Hydrogen is converted to water molecules upon contact only with agent 14 capable of converting hydrogen to water molecules. If the agent 14 is $Ag_2O$, hydrogen contacting such an agent will be converted to water molecules according to the general chemical reaction: $Ag_2O + H_2 \rightarrow 2Ag + H_2O$ (water molecules). It is important that the resultant Ag by-product of the reaction be confined within the tube 15 containing the agents 14 lest the Ag be able to form an electrically conductive path between the anodes and cathodes terminals of cells or between the anode and cathode terminals of the battery. If the agent 14 for retaining water molecules is BaO, the BaO reacts with water molecules according to the general formula: $BaO + H_2O \rightarrow Ba(OH)_2$. The molecules of water are retained by agent 14 away from the anode and cathode terminals of the cell containers and the battery, thereby reducing the possibility of forming an electrically conductive bridge between such anode and cathode terminals.

Referring now to FIG. 2, an open ended housing 11 is used to retain tubes 15 each containing electrically interconnected stacked cells 12, and a unitary means 20 for retaining and substantially uniformly distributing agents 14 adjacent side walls of the tubes 15 and the side walls of the housing 11. The unitary means 20 includes spaced apart layers 21 of a relatively thin material pervious to hydrogen and impervious to water retaining agents 14 between the layers 21. As shown in FIG. 2, the spaced apart layers 21 of means 20 form a bag-like structure. Each unitary means 20 includes a plurality of compartments 22 formed by longitudinal ribs 23. The compartments 22 retain the agents 14 in a substantially uniformly distributed manner in the means 20 and, therefore, substantially uniformly distributed in relation to side walls of the housing 11 and/or the cell containers 31. The unitary means 20 may be made from any suitable electrically insulating material of adequate mechanical strength which is heat sealable, and presents an impedance to water molecules and is pervious to hydrogen. An example of such a material is microporous polyolefin.

The tubes 15 of FIG. 2 are interconnected by electrically conducting lead 24 (and another electrically conducting lead not shown) so as to be in electrical series fashion. Electrically conducting leads 25 and 26 projecting from the upper end of the tubes 15 are electrically connected to the anode and cathode sides of the series connected cells 12 and to anode and cathode terminals (not shown) in a suitable means (not shown) used to close the open ends of the housing 11 of FIG. 2. The open ends of housing 11 of FIG. 2 may be closed by suitable heat shrinkable end caps (not shown).

Figure 3:
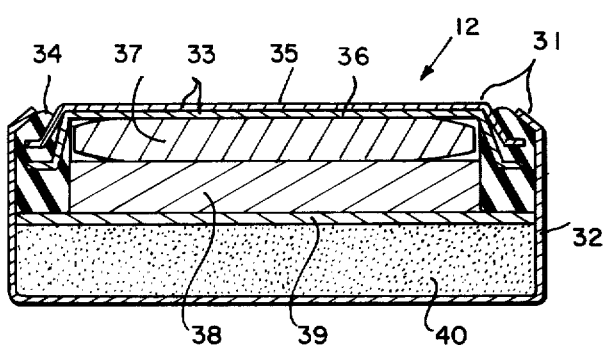
FIG. 3 is a cross sectional view of one type of electrochemical cell which may electrically interconnect with other like cells to form the batteries of FIGS. 1 and 2.

A cell may be made in various sizes and shapes including a button or flat pellet type. FIG. 3 shows a flat pellet type electrochemical cell 12 of the type used to provide one of the plurality of interconnected cells 12 shown in the tubes 15 of FIGS. 1 and 2. The cell 12 includes a housing 31. The container 31 includes a case 32 made of any suitable high mechanical strength material such as steel and the like, top 33, and sealing and electrically insulating gasket 34. Top 33 includes an outer element 35 and an inner element 36 to furnish a double top arrangement. The outer element 35 is of any suitable high mechanical strength material such as steel whereas the inner element 36 is preferably steel plated with tin. The gasket 34 is made of a suitable sealing and electrically insulating material such as neoprene or plastic, preferably nylon or polyethylene.

A porous amalgamate zinc anode pellet 37 is adjacent the inner top 36. The porous pellet 37 includes about 10 wt.% metallic mercury (Hg), the remainder substantially zinc (Zn). The porous pellet 37 is formed under a pressure of several tons per square inch.

An electrolyte (not shown in the drawing) includes potassium hydroxide (KOH) substantially saturated with zinc oxide (ZnO) in an absorbent spacer 38 adjacent the amalgamated zinc anode pellet 37. The electrolyte is typically about 35 to about 40 wt. % KOH with about 5 wt. % ZnO, the remainder essentially distilled or demineralized water. The absorbent spacer 38 is any suitable material such as alpha cellulose. An ion- permeable barrier 39 is adjacent the absorbent spacer 38. The barrier 39 is used to help prevent the migration of particles from cathode depolarizer 40 to the anode pellet 37. A suitable barrier 39 material is microporous polyvinyl chloride. The electrolyte may be gelled by using a suitable gelling agent such as about 1.5 to about 4 wt. % carboxy-methyl-cellulose. The use of a gelled electrolyte may minimize the need for spacer 38 and barrier 39. However, with the liquid electrolyte type electrochemical cell illustrated in FIG. 3, the spacer 38 and the barrier 39 are used. Adjacent the barrier 39 is a mercuric oxide (HgO)-graphite depolarizing cathode pellet 40. The depolarizing cathode pellet 40 typically includes about 92 wt. % HgO with about 8 wt. % graphite. Graphite is used in the pellet 40 to impart the desired electronic conductivity.

The electrochemical cell 12 is tightly sealed to minimize loss of electrolyte, to increase rigidity, and to help avoid access of air coming into contact with the active materials of the cell. The outer element 35 is the negative terminal contact of cell 12 whereas the case 32 forms the positive terminal contact of the cell. The case 32 has formed therein a vent (not shown) for allowing evolved hydrogen to pass from the interior of the cell 12 after accumulation of hydrogen within the container 31.

During electrical discharge of cell 12, the anode 37 expands due to the formation of ZnO and the depolarizing cathode pellet 40 becomes soft due to its conversion to metallic mercury.

As discussed herebefore, properly constructed cells should evolve little, if any, hydrogen; however, an imbalance of cell components such as an electrochemical excess of anode zinc over cathode depolarizer or contact of cathodic impurities with the anode zinc will cause hydrogen evolution during discharge. Some hydrogen will also result from electrochemical displacement from the aqueous electrolyte via the zinc anode during storage. The structure disclosed in FIG. 1 directs the movement of hydrogen and water to the agents for converting hydrogen to water and retaining water whereas the structure disclosed in FIG. 2 is a unitary means for retaining and substantially uniformly distributing the agents adjacent to the side walls of the cell containers.

It is understood that the concepts of the present invention also have applicability to removing fluids other than hydrogen from the immediate area of an individual cell. Such other fluids may be sulfur dioxide ($SO_2$) associated with a lithium cell having an electrolyte including $SO_2$.

While the concepts of the present invention are illustrated and described in presently preferred embodiments, it will be understood that modifications and variations may be effected without departing from the scope of the concepts.

What is claimed is:

1. A battery comprising a plurality of electrically interconnected electrochemical cells each of said cells having an electrode subject to hydrogen gas evolution; retaining means exterior to and separated from said cells and having retained therein an oxygen containing compound for reaction with said evolved hydrogen and which converts said evolved hydrogen to water; passage means between said electrically interconnected electrochemical cells and said retaining means for enabling said evolved hydrogen to pass from said cells and into contact with said oxygen containing compound; a water retaining agent not reactive with said hydrogen in proximity with said oxygen containing compound and with said formed water and insulatively separated from said cells thereby preventing retained water from contacting said cells; and an outer housing having contained therein said cells, said oxygen containing compound and said water retaining agent.

2. The battery as in claim 1 wherein said oxygen containing compound is a metal oxide selected from the group consisting of monovalent silver oxide ($Ag_2O$), copper oxide (CuO), active nickel oxide, manganese dioxide ($MnO_2$) and lead dioxide ($PbO_2$).

3. The battery as in claim 1 wherein said water retaining agent is selected from the group consisting of barium oxide (BaO), calcium oxide (CaO), strontium oxide (SrO) and a molecular sieve.

4. The battery as in claim 1 and further including spaced apart layers of a relatively thin material as retaining means for said oxygen containing compound with said layers being pervious to said hydrogen and impervious to water, and which layers substantially uniformly distribute said oxygen containing compound together with said water retaining agent around said cells and between said layers.

5. The battery as in claim 4 wherein said spaced layers form compartments for retaining said agents.

* * * * *